US010816136B2

(12) United States Patent
Lusso (10) Patent No.: US 10,816,136 B2
(45) Date of Patent: Oct. 27, 2020

(54) GREASE GUN PRESSURE RETURN VALVE

(71) Applicant: Gurtech (Pty) Ltd, Lions River (ZA)

(72) Inventor: Cary Donald Lusso, Lions River (ZA)

(73) Assignee: Gurtech (Pty) LTD, Lions River (ZA)

( * ) Notice: Subject to any disclaimer, the term of this patent is extended or adjusted under 35 U.S.C. 154(b) by 0 days.

(21) Appl. No.: 16/591,466

(22) Filed: Oct. 2, 2019

(65) Prior Publication Data

US 2020/0191329 A1 Jun. 18, 2020

(30) Foreign Application Priority Data

Dec. 18, 2018 (AU) ................................ 2018282292

(51) Int. Cl.
*F16K 15/18* (2006.01)
*F16N 3/12* (2006.01)
*F16N 37/02* (2006.01)

(52) U.S. Cl.
CPC .............. *F16N 3/12* (2013.01); *F16K 15/183* (2013.01); *F16N 37/02* (2013.01)

(58) Field of Classification Search
CPC . F16N 3/12; F16N 13/08; F16N 37/02; F16K 15/183
See application file for complete search history.

(56) References Cited

U.S. PATENT DOCUMENTS

| 1,869,722 A | 8/1932 | Thomas | |
|---|---|---|---|
| 4,664,298 A * | 5/1987 | Shew | F16N 3/12 184/105.2 |

(Continued)

FOREIGN PATENT DOCUMENTS

| AU | 2011100334 A4 | 4/2011 |
|---|---|---|
| AU | 2018282292 B1 | 8/2019 |
| GB | 834915 A | 5/1960 |

*Primary Examiner* — Michael R Mansen
*Assistant Examiner* — Robert T Reese
(74) *Attorney, Agent, or Firm* — Mintz Levin Cohn Ferris Glovsky and Popeo, P.C.

(57) ABSTRACT

The invention provides an apparatus comprising a grease gun (10) having a delivery line (22), the apparatus being configured to return grease under pressure from within the delivery line (22) of the grease gun (10) back to a grease reservoir (14); the grease gun (10) comprising a dispensing head (12) fitted to reservoir (14) containing grease and including a grease inlet port (16), for receiving grease from the grease reservoir (14), a grease outlet port (20) connectable to the delivery line (22) for dispensing grease; a pressure chamber (18) wherein the grease inlet port (16) is in fluid communication with the grease outlet port (20) via the pressure chamber (18); a piston (28) operable for displacing the grease from the grease inlet port (16) to the grease outlet port (20); and a one-way flow control valve located between the pressure chamber and the grease outlet port to inhibit the reverse flow of the grease from the grease outlet port back into the pressure chamber; the dispensing head (12) further comprising a pressure return port (26), located upstream of the grease inlet port (16) and linked to the grease outlet port (20) by a pressure return passage and openable into the pressure chamber (18), for returning the grease under pressure to the pressure chamber (18) and the grease reservoir (14), in which the piston (28) acts as a valve movable between a first position where the pressure return port (26) is closed and a second position where the pressure return port (26) is open.

15 Claims, 9 Drawing Sheets

(56) References Cited

U.S. PATENT DOCUMENTS

| | | | |
|---|---|---|---|
| 9,726,322 B1* | 8/2017 | Sorg | F16N 3/12 |
| 2006/0108180 A1* | 5/2006 | Grach | F16N 3/12 |
| | | | 184/105.2 |
| 2006/0231576 A1* | 10/2006 | Linkletter | F16N 3/12 |
| | | | 222/256 |
| 2010/0116850 A1* | 5/2010 | Weems | F16N 3/12 |
| | | | 222/256 |
| 2012/0067440 A1* | 3/2012 | Gurney | F16K 15/183 |
| | | | 137/528 |
| 2012/0241479 A1* | 9/2012 | Kuo | F16N 13/08 |
| | | | 222/256 |
| 2012/0298697 A1* | 11/2012 | Guo | G01F 11/022 |
| | | | 222/256 |
| 2016/0076698 A1* | 3/2016 | Maser | F16N 3/12 |
| | | | 222/326 |
| 2018/0071756 A1* | 3/2018 | Mochizuki | F16N 3/12 |

\* cited by examiner

GREASE GUN PRESSURE RETURN VALVE

CROSS-REFERENCE TO RELATED APPLICATION

This application claims priority to Australian Application Serial No. 2018282292, filed Dec. 18, 2018, entitled "GREASE GUN PRESSURE RETURN VALVE," which is hereby incorporated by reference in its entirety.

TECHNICAL FIELD OF THE INVENTION

This invention relates to a manual grease gun with an integrated valve for returning grease under pressure from the delivery line of the grease gun or similar pressure generating device back to the grease reservoir or grease cartridge.

BACKGROUND

There are a number of different types of grease guns used for delivering lubricating products to a desired location at high pressure. Very often the delivery line of these units consists of a flexible hose to allow for ease of access to all greasing points. In cases where high pressure is required to overcome a high resistance due to tight tolerances inherent in bush type assemblies or due to blockages within the grease nipple or the grease port, the flexible hose may swell with the increase in pressure. Once the greasing cycle is complete and the grease coupler is disconnected from the grease nipple, the pressure in the delivery line drops from the high pressure required for greasing, to atmospheric pressure. The result of this drop in pressure is that the delivery line, which absorbed extra grease as it ballooned under the higher pressure, now dispels this volume to waste as it returns to its normal size under atmospheric pressure. This waste grease is also greatly compounded by the fact that there are almost always small air pockets trapped within the grease which become compressed as the pressure in the delivery line rises during the greasing cycle. As the delivery line is released from the grease nipple, the air pockets expand as they return to atmospheric pressure, displacing yet more grease out the end of the delivery line, resulting in additional wasted grease, this also applies to grease guns fitted with rigid delivery lines. This waste increases grease consumption, poses a fire hazard when left on machinery and creates an environmental hazard when dropped onto the ground and allowed to enter water systems. By being able to return the grease under pressure from the delivery line, on completion of the greasing cycle, back into a predetermined grease reservoir or grease cartridge, a significant reduction in wasted grease can be achieved, thereby creating a more cost effective and environmentally friendly greasing system.

Another common feature in greasing systems is the use of a coupler known in the art as a Zerk or Hydraulic grease coupler. This coupler allows for a high pressure connection between the grease delivery line and the greasing point, most often the greasing point will be fitted with a Zerk type grease nipple as detailed on SAEJ534 and DIN71412 specifications. A common feature of the Zerk grease coupler is that it is designed such that the pressure generated within the delivery line assists with the gripping of the grease coupler to the grease nipple. The higher the pressure generated within the delivery line the higher the force with which the coupler grips the grease nipple.

When the greasing cycle is complete and pressure remains within the delivery line, the operator is required to vigorously oscillate the coupler relative to the grease nipple to cause a by-pass of grease and allow for a pressure drop in the delivery line and in turn enable the coupler to be released from the grease nipple. Waste grease is generated every time the pressure is relieved at the grease nipple in such a manner and over time the coupler and the nipple are inclined to become damaged by this undesirable process.

In many instances, this bypass grease adheres to the end of the coupler which makes it almost impossible for the operator to transfer the coupler to the next grease nipple without his fingers becoming covered with grease making the greasing operation a very unpleasant chore. This could result in the operator ignoring the troublesome greasing points which in turn results in unnecessary machine down time.

It is an intention of this invention to provide a grease gun with an integrated grease return valve, to return the grease that is under pressure, from the delivery line back to the grease reservoir or grease cartridge, which at least partially alleviates the problems of grease wastage and the grease coupler becoming locked onto the Zerk type grease nipples and most importantly reducing operator frustration.

In this specification, the term grease reservoir is to be understood to mean any container for holding and supplying grease to a grease gun, including, but not limited to pre-filled cartridges and refillable self-contained reservoirs.

SUMMARY OF THE INVENTION

In accordance with this invention there is provided an apparatus comprising a grease gun having a delivery line, the apparatus being configured to return grease under pressure from within the delivery line of the grease gun back to a grease reservoir, wherein the grease gun comprises a dispensing head to which the grease reservoir may be fitted, the dispensing head comprising: a grease inlet port, for receiving grease from the grease reservoir; a grease outlet port connectable to the delivery line for dispensing grease; a pressure chamber, wherein the grease inlet port is in fluid communication with the grease outlet port via the pressure chamber; a piston operable within the pressure chamber for displacing the grease from the grease inlet port through the pressure chamber to the grease outlet port; a one-way flow control valve located between the pressure chamber and the grease outlet port to inhibit the reverse flow of the grease from the grease outlet port back into the pressure chamber; and a pressure return port located upstream of the grease inlet port and linked to the grease outlet port by a pressure return passage, the pressure return port being openable into the pressure chamber, for returning the grease under pressure to the pressure chamber and subsequently to the grease reservoir, in which the piston acts as a valve movable between a first position where the pressure return port is closed and a second position where the pressure return port is open.

According to embodiments, when in first position, the piston is retracted past the grease inlet port, but not past the pressure return port, and optionally when in the second position, the piston is retracted past the pressure return port.

The grease inlet port may be bi-directional to allow for the return of grease under pressure from the pressure chamber back to the grease reservoir.

Alternatively the grease inlet port may include an inlet valve, to prevent the return flow of grease through the grease inlet port to the grease reservoir, in which case a separate secondary grease outlet port may be located between the pressure chamber and the grease reservoir. In this alternative embodiment, the secondary grease outlet port may be an extension of the pressure return port.

There is further provided for the piston to be manually operated by a lever and for a stroke limiter to prevent unintended extended retraction of the piston past its first position, and the unintentional return of grease from the delivery line via the pressure return port into the pressure chamber during a normal grease cycle.

The stroke limiter may comprise a sprung loaded stop extending from a link arm, which pivotally links the piston lever to the dispensing head, and engageable with the dispensing head when the lever has retracted the piston to its first position, to hinder unintended further retraction of the piston to its second position. Intentional retraction of the lever against the opposing force of the spring is required to retract the piston past its first retracted position, to its second retracted position to open the pressure return port.

Alternatively the stroke limiter may comprise a sprung loaded stepped dowel pin extending through an aperture located in the lever alongside the pivot connection between the piston lever and the piston, the sprung loaded stepped dowel being movable between an extended position in which the larger diameter portion of the stepped dowel pin abuts the piston when the piston is retracted to its first position, preventing further pivoting of the pivot connection and retraction of the piston, and a depressed position in which the smaller diameter portion of the dowel pin abuts the piston, allowing further pivoting of the pivot connection and extended retraction of the piston to its second position.

BRIEF DESCRIPTION OF THE DRAWINGS

The preferred embodiment of the invention is described below with reference to the accompanying drawings in which.

DETAILED DESCRIPTION OF THE PREFERRED EMBODIMENT

Figures 1A, 1B:
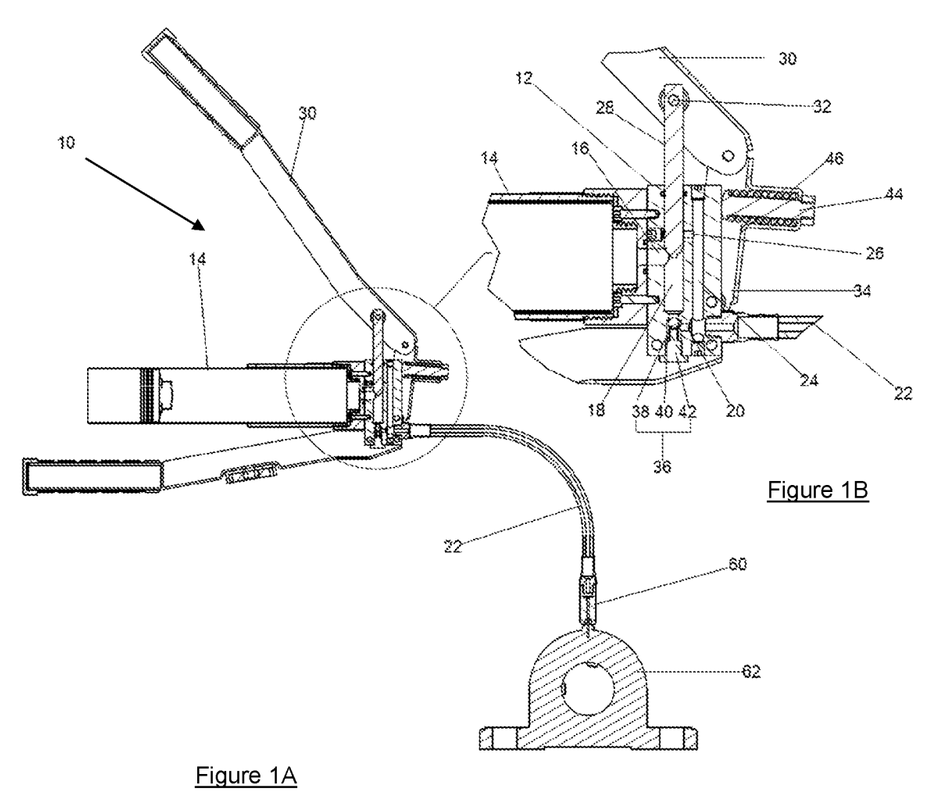
FIG. 1A is a cross section of a grease gun assembly comprising a first embodiment of the apparatus of the invention
FIG. 1B is a detailed cross-sectional view of the dispensing head of the grease gun of FIG. 1A, depicting the piston at its first retracted position for normal greasing.
Figure 2:
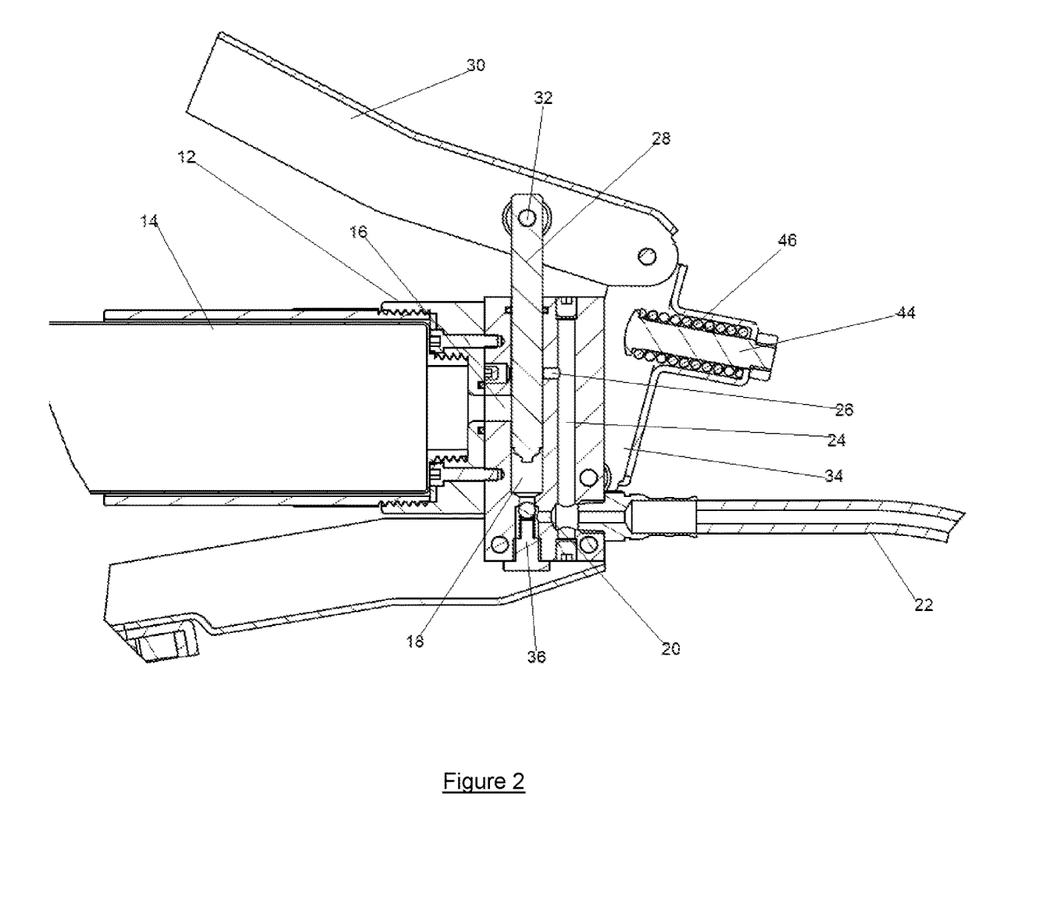
FIG. 2 is a cross-sectional view of the first embodiment of the apparatus of the invention depicting the piston midway through a pressure stroke.
Figure 3:
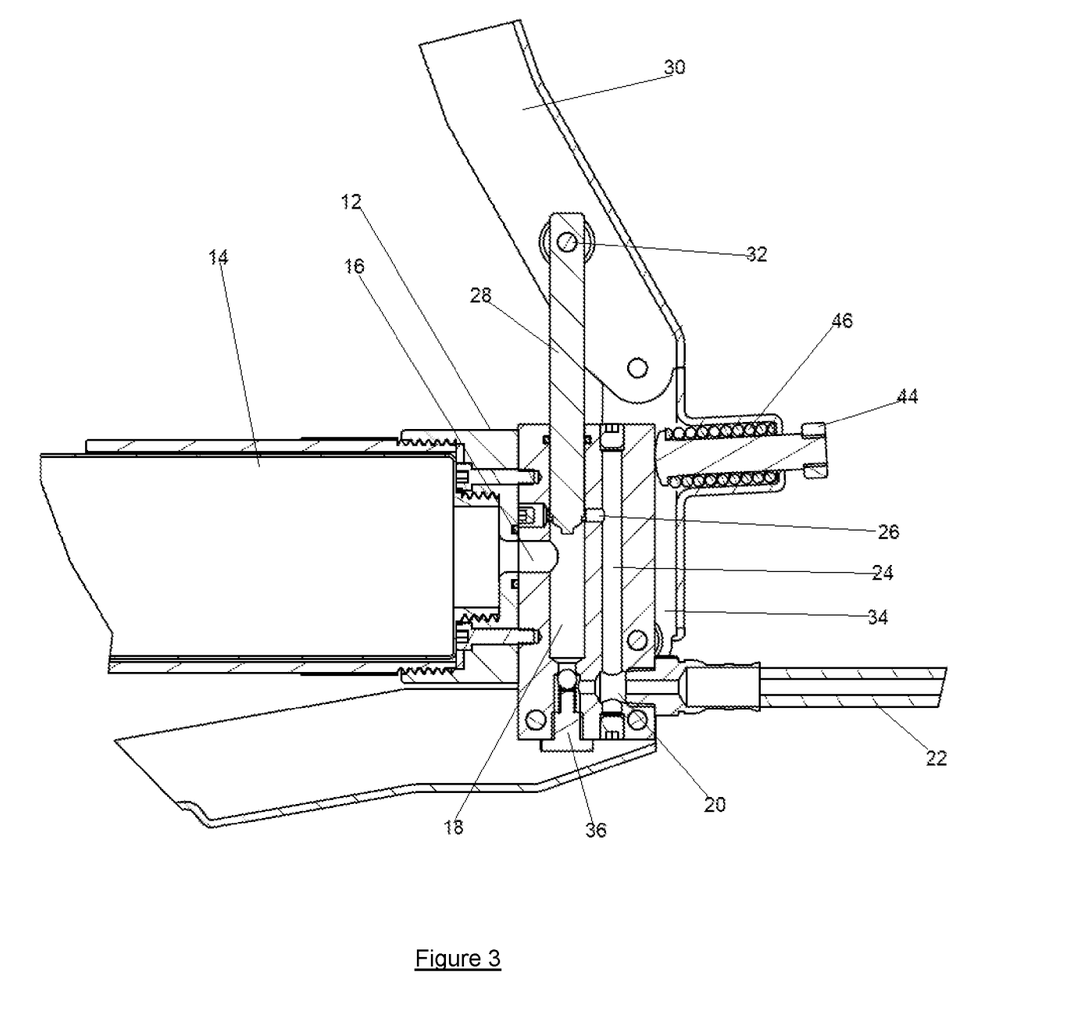
FIG. 3 is a cross-sectional view of the first embodiment of the apparatus of the invention, in which the piston is in its second retracted position.

Referring to FIGS. 1 to 9 in which like features of the invention are indicated by like numerals, Referring to FIGS. 1 to 3, the apparatus for the return of grease under pressure from within a delivery line of a manual grease gun back to a grease reservoir or grease cartridge, comprises a manual grease gun 10 including a dispensing head 12 to which a cartridge 14 containing grease is fitted. The dispensing head 12 includes a grease inlet port 16, for receiving grease from the cartridge 14, in flow communication with a grease outlet port 20 via a pressure chamber 18. The grease outlet port 20 is connectable to a delivery line 22 for delivering grease under pressure to the desired location.

A grease pressure return passage 24 extends within the dispensing head 12 from the grease outlet port 20 downstream of the delivery valve 36. A pressure return port 26 connects the grease pressure return passage 24 to the pressure chamber 18 and subsequently to the grease inlet port 16.

A piston 28 is operable within the pressure chamber 18 to pressurize and drive the grease towards the grease outlet port 20. The piston 28 is connected to a lever 30 at a pivot connection 32. The lever 30 is pivotally connected to the dispensing head 12 by a link arm 34.

A one-way flow control valve 36, comprising a check valve ball 38, spring 40 and retainer 42 is located between the pressure chamber 18 and the grease outlet port 20 to inhibit the reverse flow of grease under pressure from the grease outlet port 20 back into the pressure chamber 18.

In use and referring to FIG. 1, during a normal greasing cycle the lever 30 is operated to retract the piston 28 to a first position, at its normal retraction limit which creates a vacuum to draw the grease from the grease cartridge 14 through the grease inlet port 16, into the pressure chamber 18.

Referring to FIG. 2, the lever 30 is reversed, driving the piston 28 forward, shutting off the grease inlet port 16 and displacing the grease past the one way flow control valve 36, through the grease outlet port 20, down the delivery line 22 and through the coupler 60 and grease nipple 73 into the pillow block bearing 62. This cycle is repeated a number of times until sufficient grease has been delivered. The pressure return port 26 is maintained in a shutoff position by the piston 28 during this normal greasing cycle.

Referring to FIG. 3, when it is required to return the grease under pressure from the delivery line 22 back to the grease cartridge 14 at the end of the greasing cycle, before disconnecting the grease coupler 60 from the grease nipple 73, the pressure return port 26 needs to be opened. To accomplish this, the piston 28 is retracted past its first position to a second position where the pressure return port 26 is opened. The grease under pressure in the delivery line 22 flows into the pressure chamber 18 and back into the cartridge 14 via the grease inlet port 16 until the pressure of the grease within the delivery line 22 reduces back to atmospheric pressure.

Figure 4:
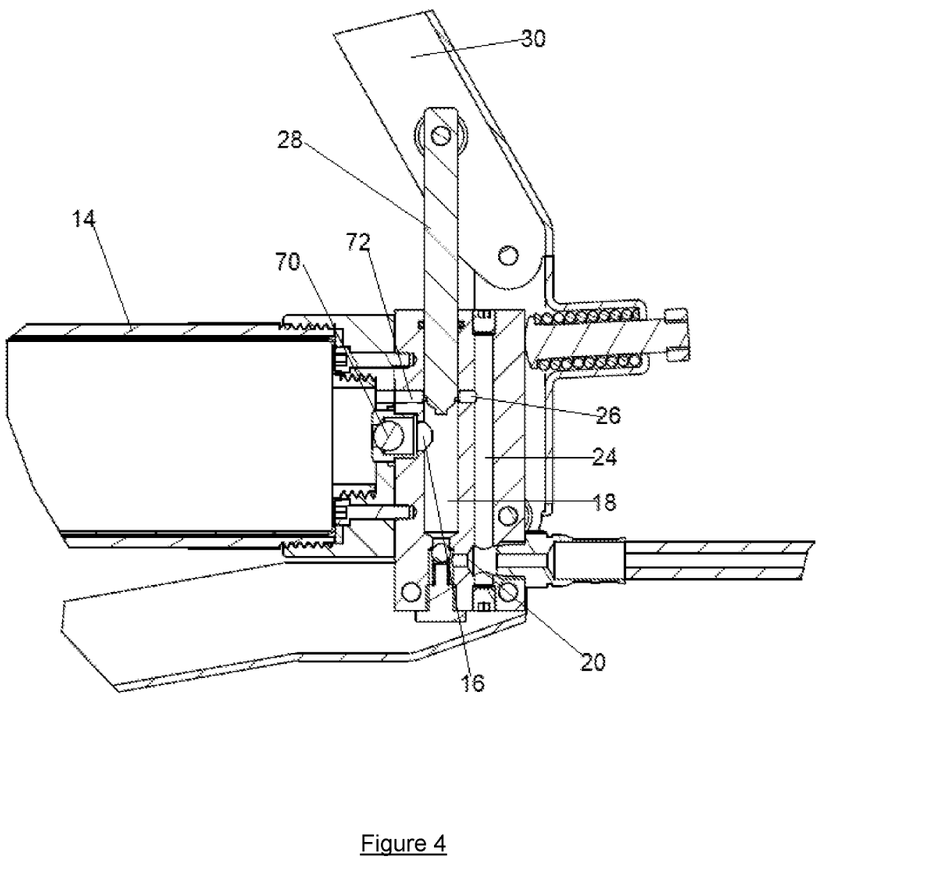
FIG. 4 is a cross-sectional view of an alternative embodiment of the apparatus of the invention, in which the piston is in its second retracted position.

Referring to FIG. 4, and in an alternative embodiment to the invention the grease inlet port 16 includes an inlet valve 70, to prevent the return flow of grease through the inlet port back to the cartridge 14. A separate secondary grease outlet port 72 is located between the pressure chamber 18 and the grease cartridge 14, to allow for the return of grease under pressure to the cartridge 14.

In this alternative embodiment, the secondary outlet port 72 is an extension of the pressure return port 26.

Referring to FIGS. 1 to 6 and in one embodiment of the invention, to prevent the unintentional return of grease under pressure during a normal grease cycle, a stroke limiter in the form of a sprung loaded stop 44 extends from the link arm 34 to engage with the dispensing head 12 when the piston 28 has been retracted by the lever 30 to its first position as depicted in FIG. 1, thus hindering unintended further retraction of the piston 28 to its second position. At this point the grease inlet port 16 is fully open to allow for the pressure chamber 18 to become charged for the next pressure stroke.

Referring to FIG. 3, only when the operator intentionally overcomes the opposing force of the spring 46 biasing against the stop 44, will the piston 28 be retracted beyond its first position to its second position to open the pressure return port 26 and allow the pressure and excess grease to return back to the cartridge 14.

Figure 7:
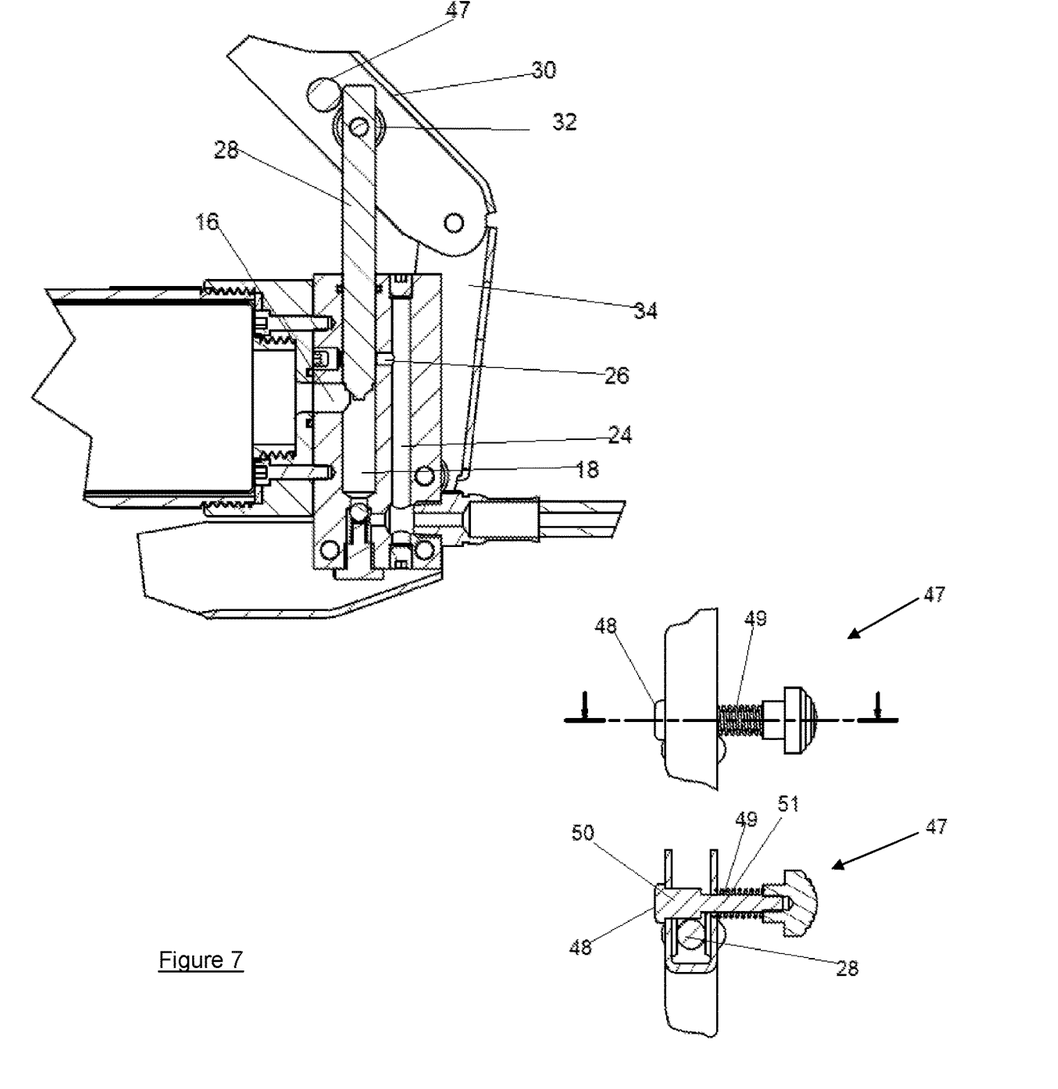
FIG. 7 is a cross cross-sectional view of a further alternative embodiment of the apparatus of the invention, depicting the piston at its first retracted position for normal greasing.
Figure 8:
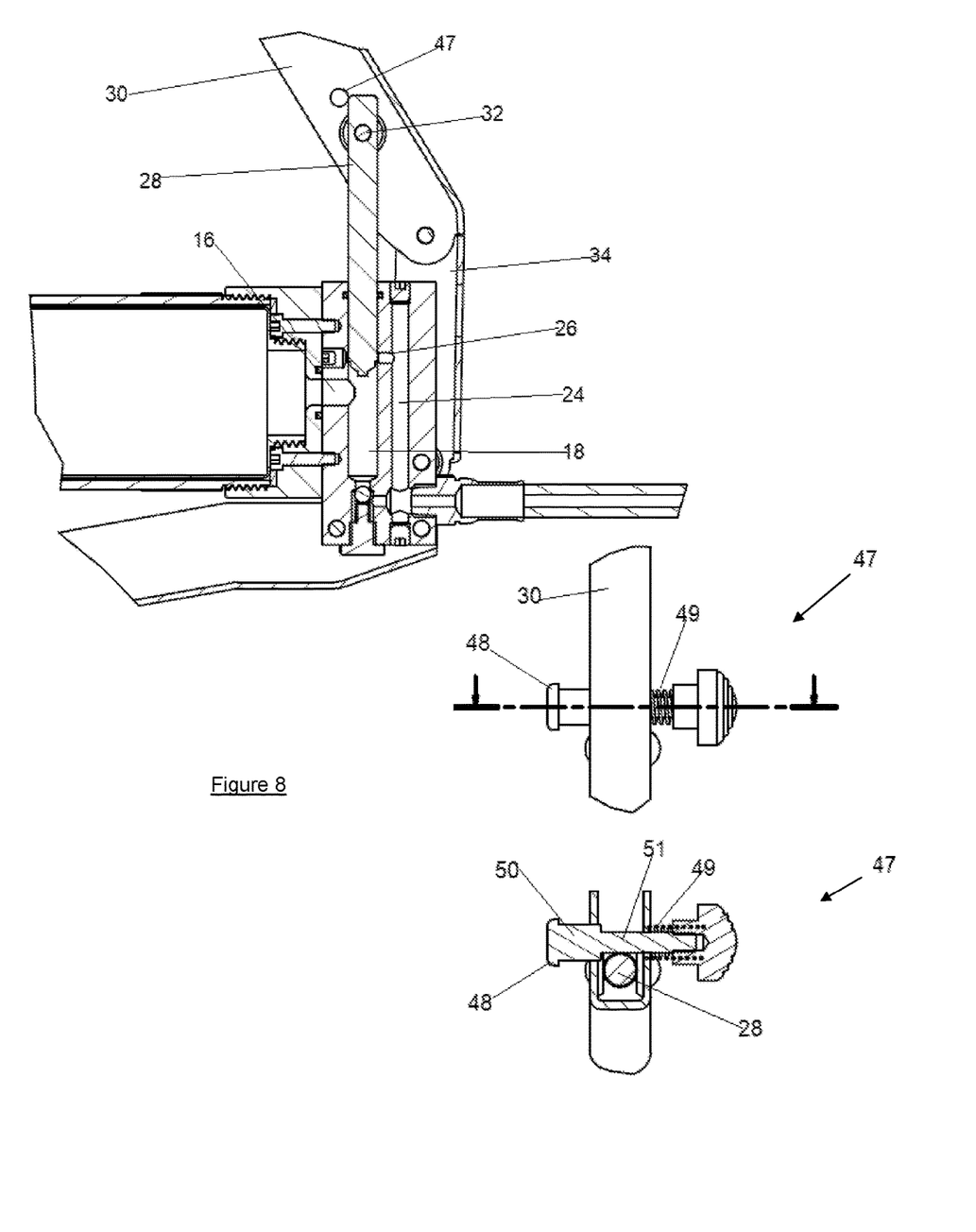
FIG. 8 is cross cross-sectional view of the further alternative embodiment of the apparatus of the invention, depicting the piston in its second retracted position.
Figure 9:
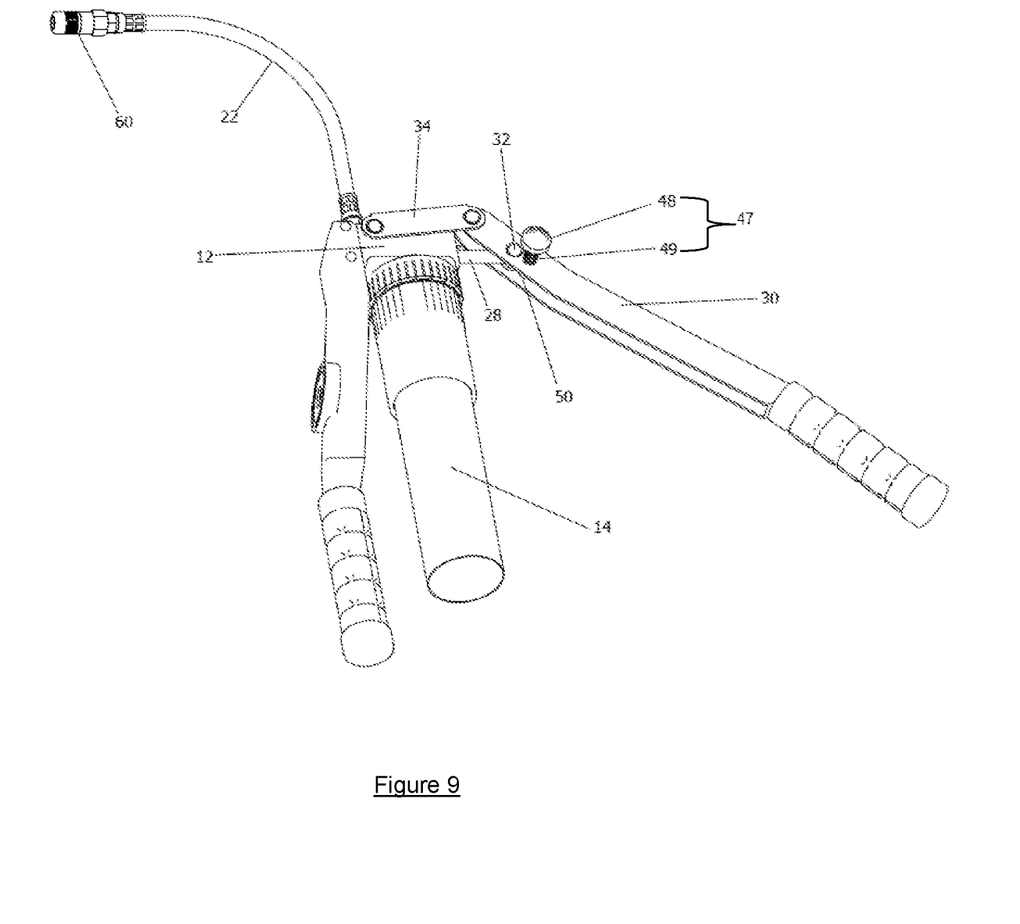
FIG. 9 is a perspective view of the further alternative embodiment of the grease gun assembly.

Referring to FIGS. 7 to 9, and in a further alternative embodiment of the invention, the stroke limiter comprises a push button 47 in the form of a sprung loaded stepped dowel pin 48 extending through an aperture in the lever 30 alongside the pivot connection 32 connecting the lever 30 to the piston 28. The push button is movable between an extended position as depicted in FIG. 7 in which the larger diameter portion 50 of the stepped dowel pin 48 abuts the piston 28 when the piston is in its first retracted position, preventing further pivoting of the pivot connection 32 and retraction of the piston, and a second position as depicted in FIG. 8 in which the smaller diameter portion 51 of the dowel pin 48 abuts the piston 28, allowing further pivoting of the pivot connection 32 and extended retraction of the piston 28 to a second position. When the operator wishes to open the pressure return port 26, once the lever has been retracted to its default stop position, and is prevented from being retracted further, the operator will depress the push button 47, pushing the dowel pin 48, so that the smaller diameter portion 51 of the pin moves into place, allowing further retraction of the lever and piston before the piston abuts the dowel pin, thus opening the pressure return port 26.

Figure 5:
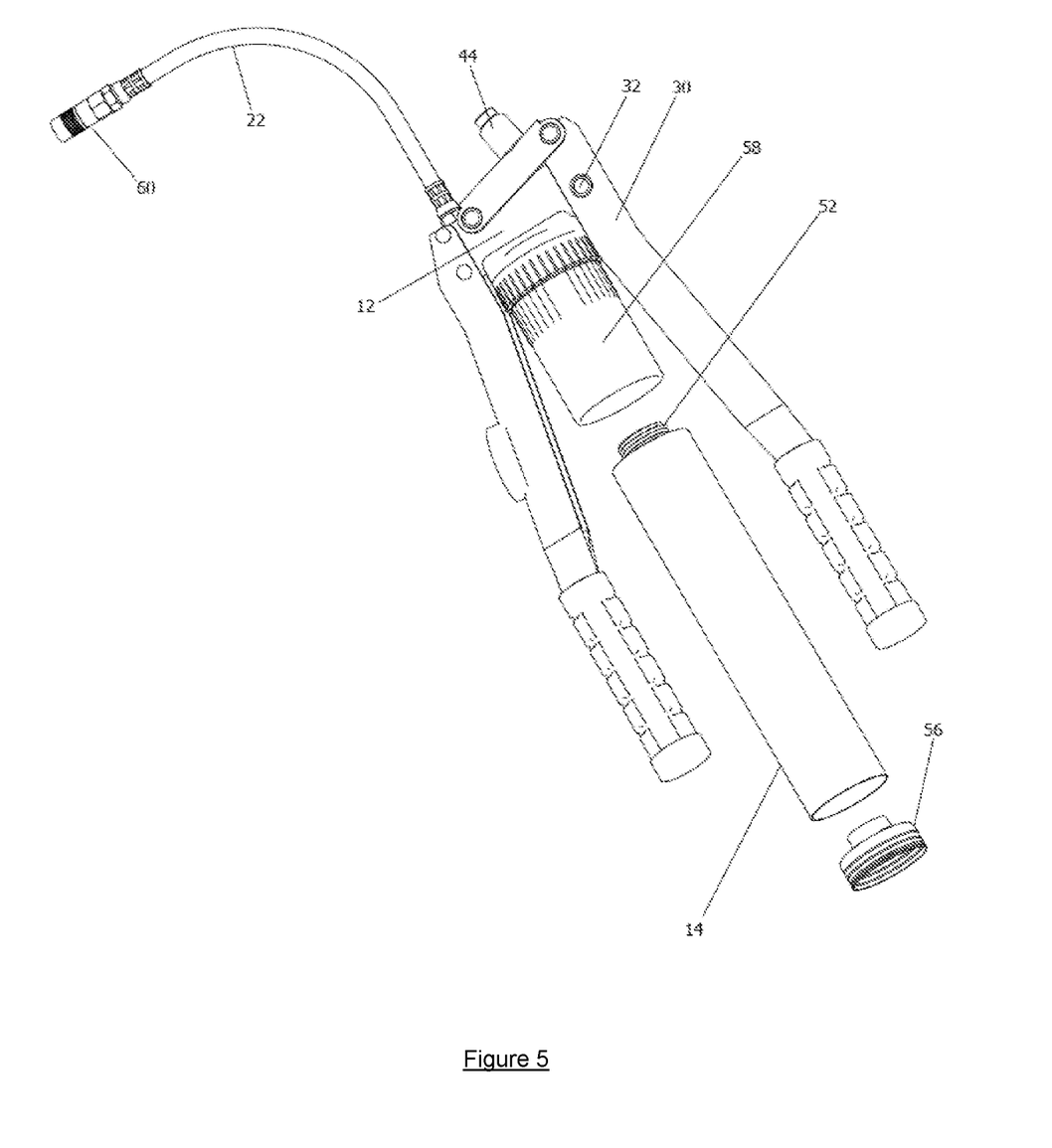
FIG. 5 is an exploded perspective view of the first embodiment of the grease gun assembly with a threaded type grease cartridge and grease follower.
Figure 6:
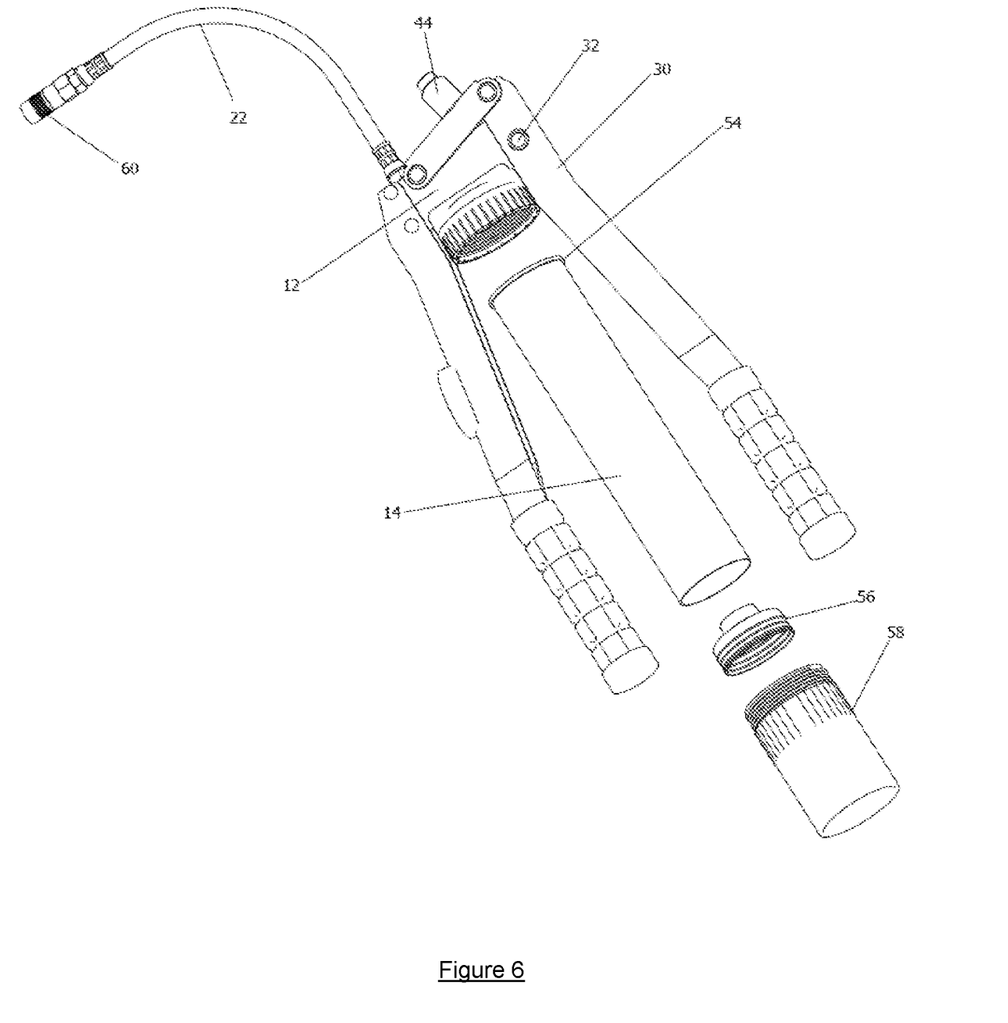
FIG. 6 is an exploded perspective view of the first embodiment of the grease gun assembly with a lipped type grease cartridge and grease follower.

Referring to FIG. 5 the dispensing head 12 of the grease gun may be adapted for use with grease cartridges having a threaded outlet 52 at their discharge end. Alternatively, and referring to FIG. 6, the dispensing head of the grease gun may be adapted for use with grease cartridges having an outer lip 54 at their discharge end. In either version, an adaptor sleeve 58 facilitates the connection of the cartridge 14 to the dispensing head 12. Both styles of cartridges have a grease follower 56 inserted at the base of the cartridge, which moves up within the cartridge as the grease is drawn from the cartridge by a vacuum. Alternatively, the dispensing head of the grease gun may be adapted for use with a refillable grease reservoir (not shown).

With the inclusion of an integrated pressure return valve, on completion of the greasing cycle, the grease under pressure within the delivery line may be returned back into the grease reservoir or grease cartridge and the coupler can be removed with ease. By using this methodology, the life of both the grease coupler and zerk type grease nipples will be extended as well as a significant reduction in wasted grease will be achieve. These positive outcomes will be directly responsible for a reduction in greasing costs and most significantly a reduction in operator frustration.

The invention claimed is:

1. An apparatus comprising a grease gun having a delivery line, the apparatus being configured to return grease under pressure from within the delivery line of the grease gun back to a grease reservoir, wherein the grease gun comprises a dispensing head to which the grease reservoir may be fitted, the dispensing head comprising:
   a grease inlet port for receiving grease from the grease reservoir;
   a grease outlet port connectable to the delivery line for dispensing grease;
   a pressure chamber, wherein the grease inlet port is in fluid communication with the grease outlet port via the pressure chamber;
   a piston operable within the pressure chamber for displacing the grease from the grease inlet port through the pressure chamber to the grease outlet port;
   a one-way flow control valve located between the pressure chamber and the grease outlet port to inhibit the reverse flow of the grease from the grease outlet port back into the pressure chamber; and
   a pressure return port located upstream of the grease inlet port and linked to the grease outlet port by a pressure return passage, the pressure return port being openable into the pressure chamber, for returning the grease under pressure to the pressure chamber and subsequently to the grease reservoir, in which the piston acts as a valve movable between a first position where the pressure return port is closed and a second position where the pressure return port is open, wherein when in its first position, the piston is retracted past the grease inlet port, but not past the pressure return port.

2. The apparatus as claimed in claim 1, in which when in its second position, the piston is retracted past the pressure return port.

3. The apparatus as claimed in claim 2, in which the grease inlet port is bidirectional to allow for the return of grease under pressure from the pressure chamber back to the grease reservoir.

4. The apparatus as claimed in claim 2, in which the grease inlet port includes an inlet valve, to prevent the return flow of grease through the grease inlet port to the grease reservoir, and a separate secondary grease outlet port is located between the pressure chamber and the grease reservoir.

5. The apparatus as claimed in claim 4, in which the secondary grease outlet port is an extension of the pressure return port.

6. The apparatus as claimed in claim 5, in which the piston is manually operated by a piston lever and a stroke limiter is provided to prevent the unintended extended retraction of the piston past its first position, and the unintended return of grease from the delivery line via the pressure return port into the pressure chamber during a normal greasing cycle.

7. The apparatus as claimed in claim 6, in which the stroke limiter comprises a sprung loaded stop, including a spring, extending from a link arm, pivotally linking the piston lever to the dispensing head, and engageable with the dispensing head when the lever has retracted the piston to its first position, to hinder unintended further retraction of piston to its second position.

8. The apparatus as claimed in claim 7, in which intentional retraction of the piston against the opposing force of the spring is required to retract the piston past its first position, to its second position, to open the pressure return port.

9. The apparatus as claimed in claim 6, in which the stroke limiter comprises a sprung loaded stepped dowel pin extending through an aperture located in the lever alongside a pivot connection between the lever and the piston, in which the sprung loaded stepped dowel pin is movable between an extended position in which a larger diameter portion of the sprung loaded stepped dowel pin abuts the piston when the piston is retracted to its first position, preventing further pivoting of the pivot connection and retraction of the piston, and a depressed position in which a smaller diameter portion of the sprung loaded stepped dowel pin abuts the piston, allowing further pivoting of the pivot connection and extended retraction of the piston to its second position.

10. The apparatus as claimed in claim 1, in which the piston is manually operated by a piston lever and a stroke limiter is provided to prevent the unintended extended retraction of the piston past its first position, and the unintended return of grease from the delivery line via the pressure return port into the pressure chamber during a normal greasing cycle.

11. The apparatus as claimed in claim 1, in which the grease inlet port includes an inlet valve, to prevent the return flow of grease through the grease inlet port to the grease reservoir, and a separate secondary grease outlet port is located between the pressure chamber and the grease reservoir.

12. The apparatus as claimed in claim 11, in which the piston is manually operated by a piston lever and a stroke limiter is provided to prevent the unintended extended retraction of the piston past its first position, and the unintended return of grease from the delivery line via the pressure return port into the pressure chamber during a normal greasing cycle.

13. The apparatus as claimed in claim 1, in which the grease inlet port is bidirectional to allow for the return of grease under pressure from the pressure chamber back to the grease reservoir.

14. The apparatus as claimed in claim 13, in which the piston is manually operated by a piston lever and a stroke limiter is provided to prevent the unintended extended retraction of the piston past its first position, and the unintended return of grease from the delivery line via the pressure return port into the pressure chamber during a normal greasing cycle.

15. The apparatus as claimed in claim 2, in which the piston is manually operated by a piston lever and a stroke limiter is provided to prevent the unintended extended retraction of the piston past its first position, and the unintended return of grease from the delivery line via the pressure return port into the pressure chamber during a normal greasing cycle.

\* \* \* \* \*